(12) United States Patent
Xu

(10) Patent No.: US 10,318,454 B2
(45) Date of Patent: Jun. 11, 2019

(54) INTERRUPT PROCESSING METHOD AND INTERRUPT CONTROLLER

(71) Applicant: Sanechips Technology Co., Ltd., Shenzhen, Guangdong (CN)

(72) Inventor: Zhiguo Xu, Guangdong (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 228 days.

(21) Appl. No.: 15/313,426

(22) PCT Filed: Aug. 20, 2014

(86) PCT No.: PCT/CN2014/084861
§ 371 (c)(1),
(2) Date: Nov. 22, 2016

(87) PCT Pub. No.: WO2015/176408
PCT Pub. Date: Nov. 26, 2015

(65) Prior Publication Data
US 2017/0139852 A1 May 18, 2017

(30) Foreign Application Priority Data

May 22, 2014 (CN) .......................... 2014 1 0218643

(51) Int. Cl.
*G06F 13/24* (2006.01)
(52) U.S. Cl.
CPC ...... *G06F 13/24* (2013.01); *G06F 2213/2416* (2013.01)
(58) Field of Classification Search
CPC .................. G06F 13/24; G06F 2213/2416
See application file for complete search history.

(56) References Cited

U.S. PATENT DOCUMENTS

| 5,727,227 | A | 3/1998 | Schmidt et al. |
| 6,205,509 | B1 * | 3/2001 | Platko ................ G06F 9/30101 710/260 |

(Continued)

FOREIGN PATENT DOCUMENTS

| CN | 1845087 A | 10/2006 |
| CN | 101086721 A | 12/2007 |

(Continued)

OTHER PUBLICATIONS

Extended European Search Report dated Mar. 29, 2017 for European Patent Application No. 14892500.1.

*Primary Examiner* — Eric T Oberly
(74) *Attorney, Agent, or Firm* — Plumsea Law Group, LLC

(57) ABSTRACT

Disclosed are an interrupt processing method and an interrupt controller. Before a CPU writes interrupt processing completion identification information of a current interrupt into an interrupt controller, interrupt source clear information of the interrupt is stored into the interrupt controller; and then when the interrupt controller receives a request, sent by the CPU, for writing the interrupt processing completion identification information, an interrupt source of the interrupt is directly cleared according to the interrupt source clear information stored in the interrupt controller, the CPU does not need to firstly access an interrupt clear register of a corresponding peripheral through a plurality of bus converter bridges to acquire information needed for clearing the interrupt source and then perform clearance. Therefore, the abovementioned solution can shorten the time needed by the CPU for clearing the interrupt source to a relatively great extent and avoid delaying the response time of other interrupts.

13 Claims, 5 Drawing Sheets

(56) References Cited

U.S. PATENT DOCUMENTS

| | | | |
|---|---|---|---|
| 6,263,395 B1* | 7/2001 | Ferguson | G06F 13/24 710/262 |
| 6,581,120 B1* | 6/2003 | Ko | G06F 13/26 710/260 |
| 2008/0147946 A1 | 6/2008 | Pesavento et al. | |
| 2011/0047309 A1* | 2/2011 | Brinkmann | G06F 13/24 710/261 |

FOREIGN PATENT DOCUMENTS

| | | |
|---|---|---|
| CN | 102662889 A | 9/2012 |
| CN | 103544125 A | 1/2014 |
| WO | 2009/158528 A2 | 12/2009 |

* cited by examiner

INTERRUPT PROCESSING METHOD AND INTERRUPT CONTROLLER

CROSS-REFERENCE TO RELATED APPLICATION(S)

This application is the U.S. National Phase application of PCT application number PCT/CN2014/084861 having a PCT filing date of Aug. 20, 2014, which claims priority of Chinese patent application 201410218643.3 filed on May 22, 2014, the disclosures of which are hereby incorporated by reference.

TECHNICAL FIELD

The present document relates to the technical field of interrupt processing, in particular to an interrupt processing method and an interrupt controller.

BACKGROUND

In the field of design of interrupt controllers on mobile chips, an interrupt controller processing mode which is commonly seen at present is a mode of passively receiving an interrupt signal. A structure of a current interrupt controller is as illustrated in FIG. 1. At present, the design of the mobile chip adopts SOC architecture, almost all peripherals are integrated on the chip, different buses and bus bridges are used as slaves to complete interaction with a CPU, and an interrupt line is used as a master to complete interaction with the CPU. All interrupts in peripherals are connected to an interrupt controller by sharing one interrupt line. A sampling interface in the interrupt controller performs sampling to the connected interrupt line and sends a sampling result to an interrupt control logic. When a certain interrupt line connected to the interrupt controller is effective, the interrupt control logic judges whether a current sampled signal is effective according to information preset by a user in a register group through a slave port, such as interrupt enable or not, interrupt triggering mode and interrupt priority. If yes, the sampling interface is controlled to stop performing sampling to the interrupt line of the current response, the interrupt line connected to the CPU is simultaneously enabled to be effective and the CPU is enabled to make a response to the interrupt. The CPU automatically turns off a master interrupt, then operates an interrupt processing program, reads a current corresponding interrupt number from an interrupt controller group, and then processes the corresponding interrupt according to the interrupt number. If a triggering mode of the interrupt to which a response is made is of a level type, an interrupt clear register in the corresponding peripheral further needs to be written in the interrupt processing program to clear an interrupt source. After interrupt processing is completed, the interrupt processing program will write a value required by the interrupt controller into a designated register in the interrupt controller group, and thereby the interrupt control logic will enable the sampling interface to continuously perform sampling to the interrupt line of the current response to make a response to a new interrupt. Simultaneously, the master interrupt of the CPU will be turned on to make a response to other interrupts.

In the abovementioned interrupt processing method of the interrupt controller, for the level-triggered interrupt, under a situation that the interrupt source is not cleared, the interrupt controller will continuously make a response to the current interrupt after making a response to one interrupt, and a system operation fault is caused. Simultaneously, in an SOC system, peripherals are often mounted under sub-buses of different speeds, and when the CPU clears the interrupt source, the CPU needs to access the interrupt clear register of the corresponding peripheral through many bus converter bridges to acquire information needed for clearing the interrupt source; consequently the CPU needs to spent much time in performing an interrupt source clear operation and it is not beneficial to quick response to the interrupt; and the interrupt processing principle is that the time of turning off the master interrupt of the system is as short as possible, and otherwise, the response time of other interrupts will be delayed.

SUMMARY

The major technical problem to be solved by the embodiments of the present document is to provide an interrupt processing method and an interrupt controller, so as to solve the problem that a CPU needs to spend much time in clearing an interrupt source.

In order to solve the abovementioned technical problem, the following technical solution is adopted:

An interrupt processing method includes:

before a CPU writes interrupt processing completion identification information of a current interrupt into an interrupt controller, storing interrupt source clear information of the interrupt into the interrupt controller; and when the interrupt controller receives a request, sent by the CPU, for writing the interrupt processing completion identification information, clearing an interrupt source of the interrupt according to the interrupt source clear information stored in the interrupt controller.

Alternatively, the interrupt source clear information includes an interrupt clear register address of a peripheral which produces the interrupt and content in an interrupt status register corresponding to the interrupt.

Alternatively, the step of storing the interrupt source clear information of the interrupt into the interrupt controller includes:

when the peripheral is initialized, acquiring the interrupt clear register address of the peripheral and storing the interrupt clear register address into the interrupt controller.

Alternatively, the method further includes: when the peripheral is initialized, acquiring an interrupt status register address of the peripheral and storing the interrupt status register address into the interrupt controller.

Alternatively, the step of storing the interrupt source clear information of the interrupt into the interrupt controller includes:

when the CPU makes a response to the interrupt produced by the peripheral, reading a content in the interrupt status register corresponding to the interrupt according to the interrupt status register address, and storing the content in the interrupt status register corresponding to the interrupt into the interrupt controller.

Alternatively, after the CPU makes the response to the interrupt and when the content in the interrupt status register corresponding to the interrupt needs to be acquired, the content is acquired from the interrupt controller by directly using the interrupt status register address stored in the interrupt status register.

Alternatively, the step of clearing the interrupt source of the interrupt according to the interrupt source clear information stored in the interrupt controller includes:

initiating bus write transmission by adopting the interrupt clear register address and using the content in the interrupt status register as data to clear the interrupt source.

Alternatively, the interrupt is a level-triggered interrupt.

An interrupt controller includes a storage module and an interrupt clear module;

the interrupt clear module is arranged to, before a CPU writes interrupt processing completion identification information of a current interrupt into the interrupt controller, acquire interrupt source clear information of the interrupt and store the interrupt source clear information into the storage module; and when the interrupt controller receives a request, sent by the CPU, for writing the interrupt processing completion identification information, clear an interrupt source of the interrupt according to the interrupt source clear information stored in the storage module; and the storage module is arranged to store the interrupt source clear information.

Alternatively, the interrupt source clear information includes an interrupt clear register address of a peripheral which produces the interrupt and content in an interrupt status register corresponding to the interrupt.

Alternatively, the storage module includes an interrupt clear register address storage unit;

the interrupt clear module is further arranged to, when the peripheral is initialized, acquire the interrupt clear register address of the peripheral and store the interrupt clear register address into the interrupt clear register address storage unit; and the interrupt clear register address storage unit is arranged to store the interrupt clear register address of the peripheral.

Alternatively, the storage module includes an interrupt status register address storage unit;

the interrupt clear module is further arranged to, when the peripheral is initialized, acquire an interrupt status register address of the peripheral and store the interrupt status register address into the interrupt status register address storage unit; and the interrupt status register address storage unit is arranged to store the interrupt status register address of the peripheral.

Alternatively, the storage module further includes an interrupt status register content storage unit;

the interrupt clear module is further arranged to, when the CPU module makes a response to the interrupt produced by the peripheral, read the content in the interrupt status register corresponding to the interrupt according to the interrupt status register address, and store the content in the interrupt status register corresponding to the interrupt into the interrupt status register content storage unit; and the interrupt status register content storage unit is arranged to store the content in the interrupt status register corresponding to the interrupt.

Alternatively, the interrupt status register content storage unit is further arranged to, after the CPU makes the response to the interrupt and when the content in the interrupt status register corresponding to the interrupt needs to be acquired, provide the CPU with the interrupt status register content stored content by the CPU.

Alternatively, the interrupt clear module is arranged to clear the interrupt source of the interrupt according to the interrupt source clear information stored in the storage module in accordance with the following modes:

initiating bus write transmission by adopting the interrupt clear register address and using the content in the interrupt status register as data to clear the interrupt source.

According to the interrupt processing method and the interrupt controller in the abovementioned technical solution, before a CPU writes interrupt processing completion identification information of a current interrupt into an interrupt controller, interrupt source clear information of the interrupt is stored into the interrupt controller; and then when the interrupt controller receives a request, sent by the CPU, for writing the interrupt processing completion identification information, an interrupt source of the interrupt is directly cleared according to the interrupt source clear information stored in the interrupt controller, and the CPU does not need to firstly access an interrupt clear register of a corresponding peripheral through a plurality of bus converter bridges to acquire information needed for clearing the interrupt source and then perform the clearance. Therefore, the solution provided by the present document can shorten the time needed for clearing the interrupt source to a relatively great extent and avoid delaying the response time of other interrupts.

DETAILED EMBODIMENTS OF THE INVENTION

The present document will be further described below in detail through specific embodiments with reference to the drawings.

Embodiment 1

Figure 2:
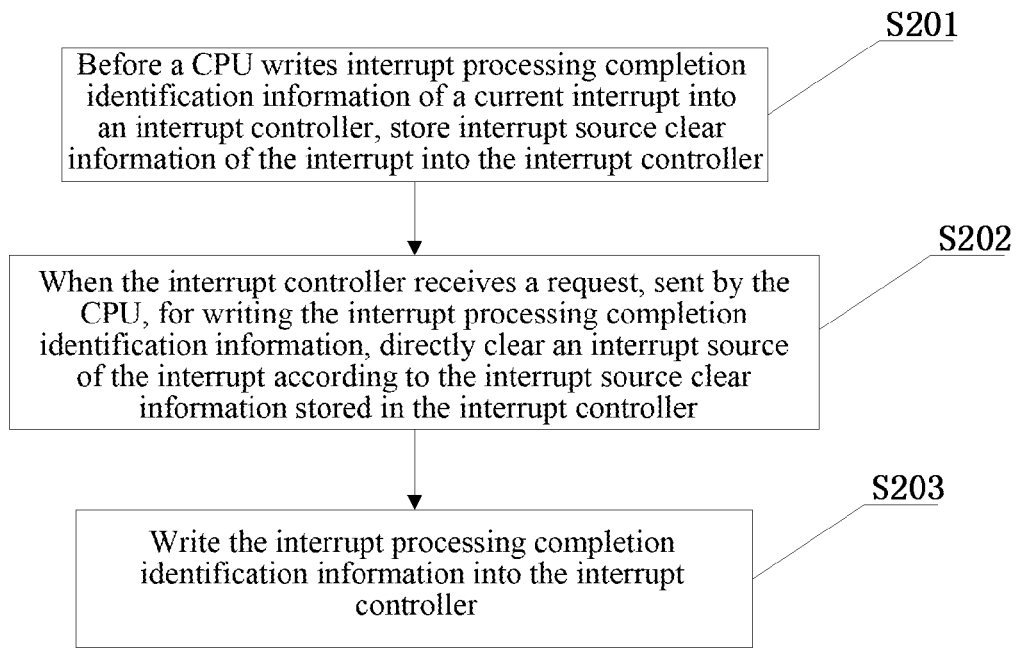
FIG. 2 illustrates a flowchart of an interrupt processing method provided by embodiment 1 of the present document.

Please refer to FIG. 2. An interrupt processing method provided by this embodiment includes the following steps:

In step S201, before a CPU writes interrupt processing completion identification information of a current interrupt into an interrupt controller, interrupt source clear information of the interrupt is stored into the interrupt controller.

The interrupt processing completion identification information in this embodiment refers to information which is used for telling the interrupt controller about the end of the processing of the current interrupt after the processing of the interrupt is completed, so as to enable the interrupt controller to make a response to a new interrupt and simultaneously turn on a master interrupt of the CPU to make responses to other interrupts.

The interrupt processing completion identification information is a value required by the interrupt controller, e.g., it may be an interrupt number, an interrupt vector address or a fixed value. An interrupt processing program will write the value required by the interrupt controller into a designated register in an interrupt controller group, such that an interrupt control logic of the interrupt controller enables a sampling interface to continuously perform sampling to an interrupt line of the current response to make a response to a new interrupt; and simultaneously the master interrupt of the CPU will be turned on to make responses to other interrupts;

in step 202, when the interrupt controller receives a request, sent by the CPU, for writing the interrupt processing completion identification information, an interrupt source of the interrupt is directly cleared according to the interrupt source clear information stored in the interrupt controller.

In step 203, the interrupt processing completion identification information is written into the interrupt controller such that an interrupt control logic of the interrupt controller enables a sampling interface to continuously perform sampling to an interrupt line of a current response to make a response to a new interrupt; and simultaneously a master interrupt of the CPU is turned on to make responses to other interrupts.

It can be seen that, in the interrupt processing method provided by this embodiment, before the CPU writes the interrupt processing completion identification information of the current interrupt into the interrupt controller, the interrupt source clear information of the interrupt is stored in advance into the interrupt controller; and then after the CPU processes the interrupt, the clearance of the interrupt source can be directly performed according to the interrupt source clear information stored in advance in the interrupt controller, and the CPU does not need to access an interrupt clear register of a corresponding peripheral through a plurality of bus converter bridges to acquire information needed for clearing the interrupt source and then perform clearance. Therefore, the time needed for clearing the interrupt source can be shortened to a relatively great extent and delaying the response time of other interrupts is avoided.

In this embodiment, the interrupt source clear information includes an interrupt clear register address of a peripheral which produces the interrupt and content in an interrupt status register corresponding to the interrupt. For the interrupt clear register address, when the peripheral is initialized, the interrupt clear register address of the peripheral may be acquired and stored in the interrupt controller. For the storage of the content in the interrupt status register corresponding to the interrupt, it includes: when it is monitored that a CPU module makes a response to the interrupt produced by the peripheral, the content in the interrupt status register corresponding to the interrupt is read according to the interrupt status register address corresponding to the interrupt and is stored into the interrupt controller, i.e., when it is monitored that the CPU makes a response to one interrupt, the content in the interrupt status register corresponding to the interrupt is immediately acquired. In addition, in this embodiment, when the peripheral is initialized, the interrupt status register address of the peripheral may be acquired in advance and stored into the interrupt controller, and thus, when the content in the interrupt status register corresponding to the interrupt is to be acquired, it may be acquired by directly using the interrupt status register address stored in the interrupt controller.

In this embodiment, after the CPU makes the response to the interrupt and when the content in the interrupt status register corresponding to the interrupt needs to be acquired, the content may be directly acquired from the interrupt controller since the interrupt controller has already acquired in advance and stored the content in the interrupt status register corresponding to the interrupt. In chip design, interaction between the interrupt controller and the CPU generally has a very low delay, and thus by temporarily storing the content needed by the CPU in advance into the interrupt controller, it obviously has a lower access delay to directly acquire the content from the interrupt controller when the CPU acquires the content.

In this embodiment, when the CPU sends a request for acquiring the content in the corresponding interrupt status register to the interrupt controller, if the interrupt controller has not completely acquire the content in the corresponding interrupt status register from the peripheral, the operation that the CPU reads the content from the interrupt controller will be firstly blocked; and after the interrupt controller completely acquires the content in the corresponding interrupt status register from the peripheral, the blocking operation performed to the CPU is canceled. Since the interrupt controller in this embodiment has already started reading the content in the interrupt status register from the corresponding peripheral after the CPU makes the response to the interrupt, microsecond-scale time, i.e., time from the moment when the interrupt controller starts to make the response to the interrupt to the moment when the CPU completes acquiring the content in the interrupt status register of the peripheral, has already elapsed when the CPU needs to acquire the content, and thus the probability of occurrence of the blocking operation here is substantially zero.

In this embodiment, in step 202, the operation that the interrupt source of the interrupt is cleared according to the interrupt source clear information stored in the interrupt controller specifically includes: bus write transmission is initialized by adopting the interrupt clear register address and using the content in the interrupt status register as data to clear the interrupt source of the interrupt. In this embodiment, specifically the corresponding interrupt clear register address may be found through an index of an interrupt number of the current interrupt.

The interrupt in this embodiment may specifically refer to a level-triggered interrupt. Of course, it may also be any other interrupts which need interrupt source clearance.

Embodiment 2

Figure 3:
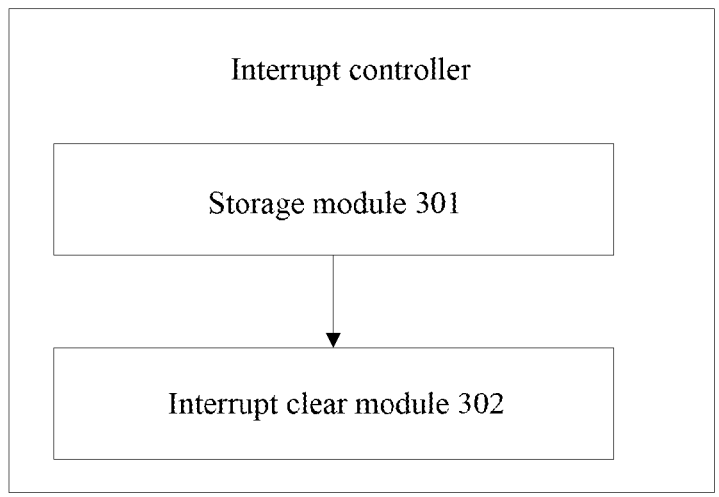
FIG. 3 illustrates a structural diagram of an interrupt controller provided by embodiment 2 of the present document.

This embodiment provides an interrupt controller. Please refer to FIG. 3. The interrupt controller includes a storage module 301 and an interrupt clear module 302, herein:

the interrupt clear module 302 is arranged to, before a CPU writes interrupt processing completion identification information of a current interrupt into the interrupt controller, acquire interrupt source clear information of the interrupt and store the interrupt source clear information into the storage module 301; and when the interrupt controller receives a request, sent by the CPU, for writing the interrupt processing completion identification information, clear an interrupt source of the interrupt according to the interrupt source clear information stored in the storage module 301.

It can be seen that, when the interrupt controller provided by this embodiment is compared with the related terminal controller, it is added with the storage module 301 which is specially used for storing the interrupt source clear information and the interrupt clear module 302 which is used for clearing the interrupt source according to the interrupt source clear information stored in the storage module 301. Since the interrupt source clear information in this embodiment is stored in advance in the storage module 301 of the interrupt controller before the processing of the interrupt is completed, the interrupt source clear information may be directly acquired from the interrupt controller to clear the interrupt source after the processing of the interrupt is completed, and thus the time for clearing the interrupt source may be shortened to a relatively great extent.

The interrupt source clear information in this embodiment includes an interrupt clear register address of a peripheral which produces the interrupt and content in an interrupt status register corresponding to the interrupt.

Correspondingly, the storage module 301 includes an interrupt clear register address storage unit and an interrupt status register content storage unit.

Herein, the interrupt clear module 302 is arranged to, when the peripheral is initialized, acquire the interrupt clear register address of the peripheral and store the interrupt clear register address into the interrupt clear register address storage unit.

The interrupt clear module 302 is further arranged to, when the CPU module makes a response to the interrupt produced by the peripheral, read the content in the interrupt status register corresponding to the interrupt according to the interrupt status register address corresponding to the interrupt, and store the content in the interrupt status register corresponding to the interrupt into the interrupt status register content storage unit.

In this embodiment, the storage module 301 may further includes an interrupt status register address storage unit, and the interrupt clear module 302 may be further arranged to, when the peripheral is initialized, acquire in advance an interrupt status register address of the peripheral and store the interrupt status register address into the interrupt status register address storage unit. Thereby, when the content in the interrupt status register corresponding to the interrupt is acquired, it may be acquired by directly using the interrupt status register address stored in the interrupt status register.

In this embodiment, after the CPU makes the response to the interrupt and when the content in the interrupt status register corresponding to the interrupt needs to be acquired, since the interrupt controller has already acquired in advance and stored the content in the interrupt status register corresponding to the interrupt, the content may be directly acquired from the interrupt controller. At this moment, the interrupt status register content storage unit is further arranged to, after the CPU makes the response to the interrupt and when the content in the interrupt status register corresponding to the interrupt needs to be acquired, directly provide the CPU with the content in the interrupt status register stored by the CPU. In chip design, interaction between the interrupt controller and the CPU generally has a very low delay, and thus by temporarily storing the content needed by the CPU in advance into the interrupt controller, it obviously has a lower access delay to directly acquire the content from the interrupt controller when the CPU acquires the content.

In this embodiment, the interrupt clear module 302 is arranged to clear the interrupt source of the interrupt according to the interrupt source clear information stored in the storage module 301 in accordance with the following modes: initiating bus write transmission by adopting the interrupt clear register address and using the content in the interrupt status register as data to clear the interrupt source.

The interrupt in this embodiment may specifically refer to a level-triggered interrupt. Of course, it may also be any other interrupts which need interrupt source clearance.

Embodiment 3

In order to better understand the present document, on the basis of embodiment 2, this embodiment will further describe the solution provided by the present document by taking a specific interrupt controller as an example.

Figure 1:
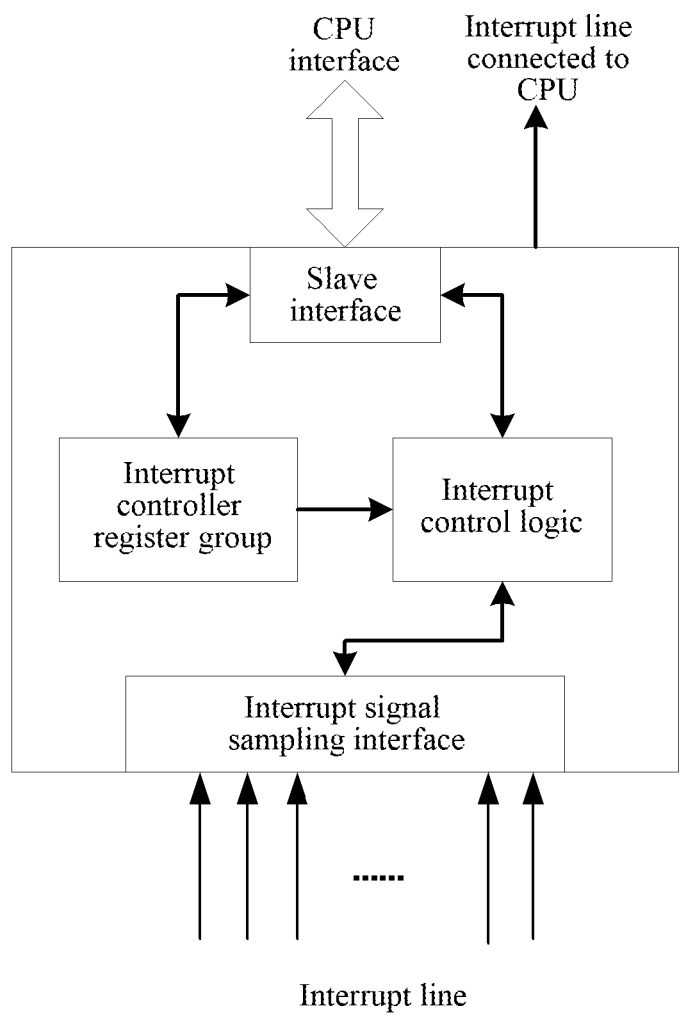
FIG. 1 illustrates a structural schematic diagram of an interrupt controller.
Figure 4:
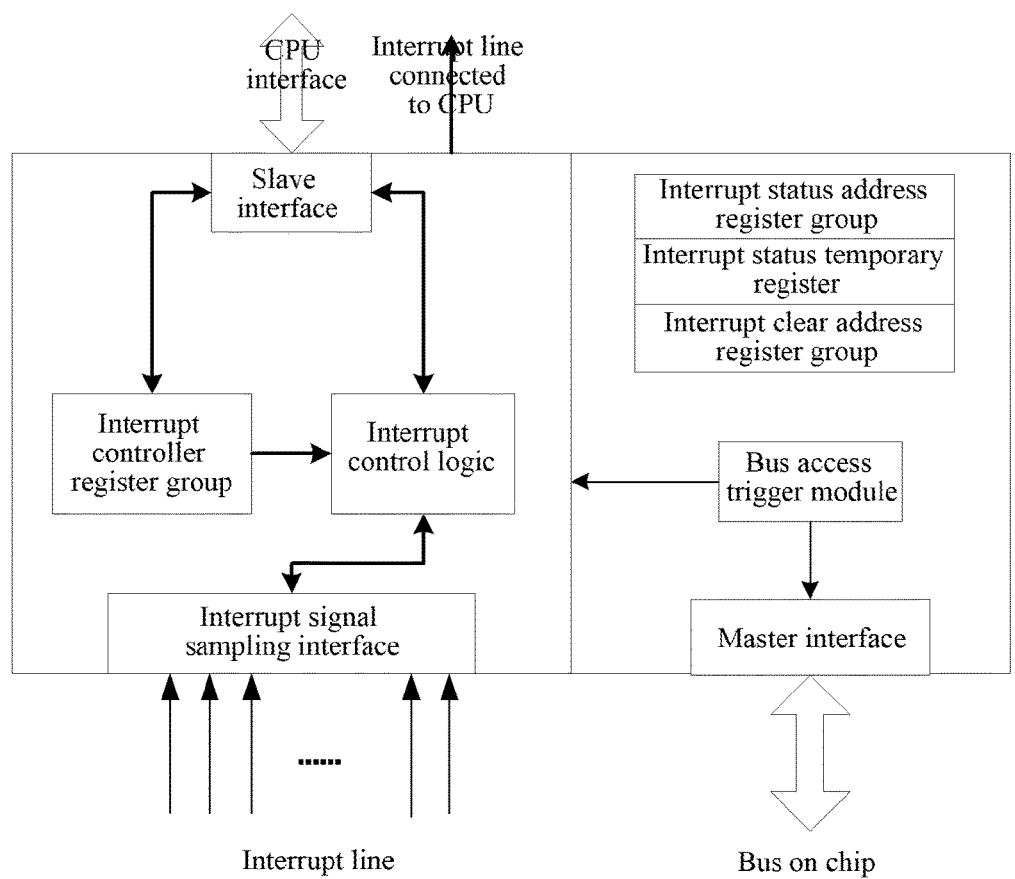
FIG. 4 illustrates a structural diagram of an interrupt controller provided by embodiment 3 of the present document.

Please refer to FIG. 4. As compared with the interrupt controller illustrated in FIG. 1, the interrupt controller provided by this embodiment is added with a storage module 301 and an interrupt clear module 302, herein, the storage module 301 specifically includes an interrupt status address register group (corresponding to the interrupt status register address storage unit), an interrupt clear address register group (corresponding to abovementioned interrupt clear register address storage unit) and an interrupt status temporary register (corresponding to abovementioned interrupt status register content storage unit); the interrupt status address register group is arranged to store interrupt status register addresses of a peripheral, and the various registers in this group are addressed sequentially according to system interrupt numbers (i.e., specifically, in this embodiment, the corresponding interrupt status register address may be searched through the interrupt number); and of course, addressing may also be performed by adopting other modes which can realize correspondence one to one. The interrupt status temporary register is arranged to temporarily store interrupt status register content of an interrupt to which a response is made by a CPU at current. The interrupt clear address register group is arranged to store interrupt clear register addresses of the peripheral, and the various registers in this group are addressed sequentially according to system interrupt numbers (i.e., specifically, in this embodiment, the corresponding interrupt clear register address may be searched through the interrupt number), and of course, addressing may also be performed by adopting other modes which can realize correspondence one to one. Each register in the register group in this embodiment is implemented through 32 bits (of course, it should be understood that it is not limited to implement through 32 bits).

The interrupt clear module 302 in this embodiment is specifically a bus access trigger module and the bus access trigger module may be arranged to detect the interaction between the CPU and the interrupt controller to trigger read/write operations of a response interface (e.g., a master interface).

Besides, the interrupt controller provided by this embodiment further realizes a master interface of a primary bus in a chip, and the master interface is used for reading and writing peripheral registers.

Figure 5:
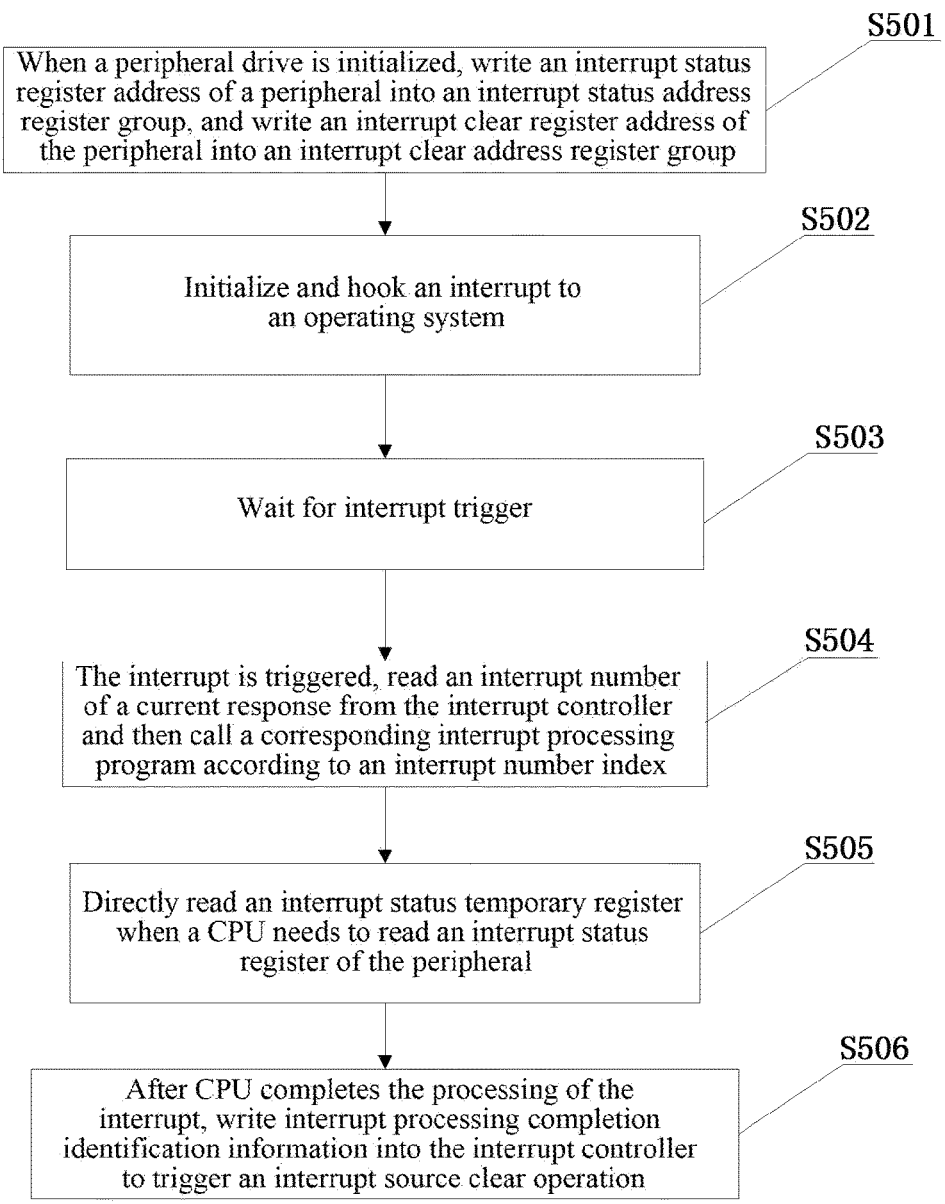
FIG. 5 illustrates a flowchart of triggering interrupt source clearance provided by embodiment 3 of the present document.
Figure 6:
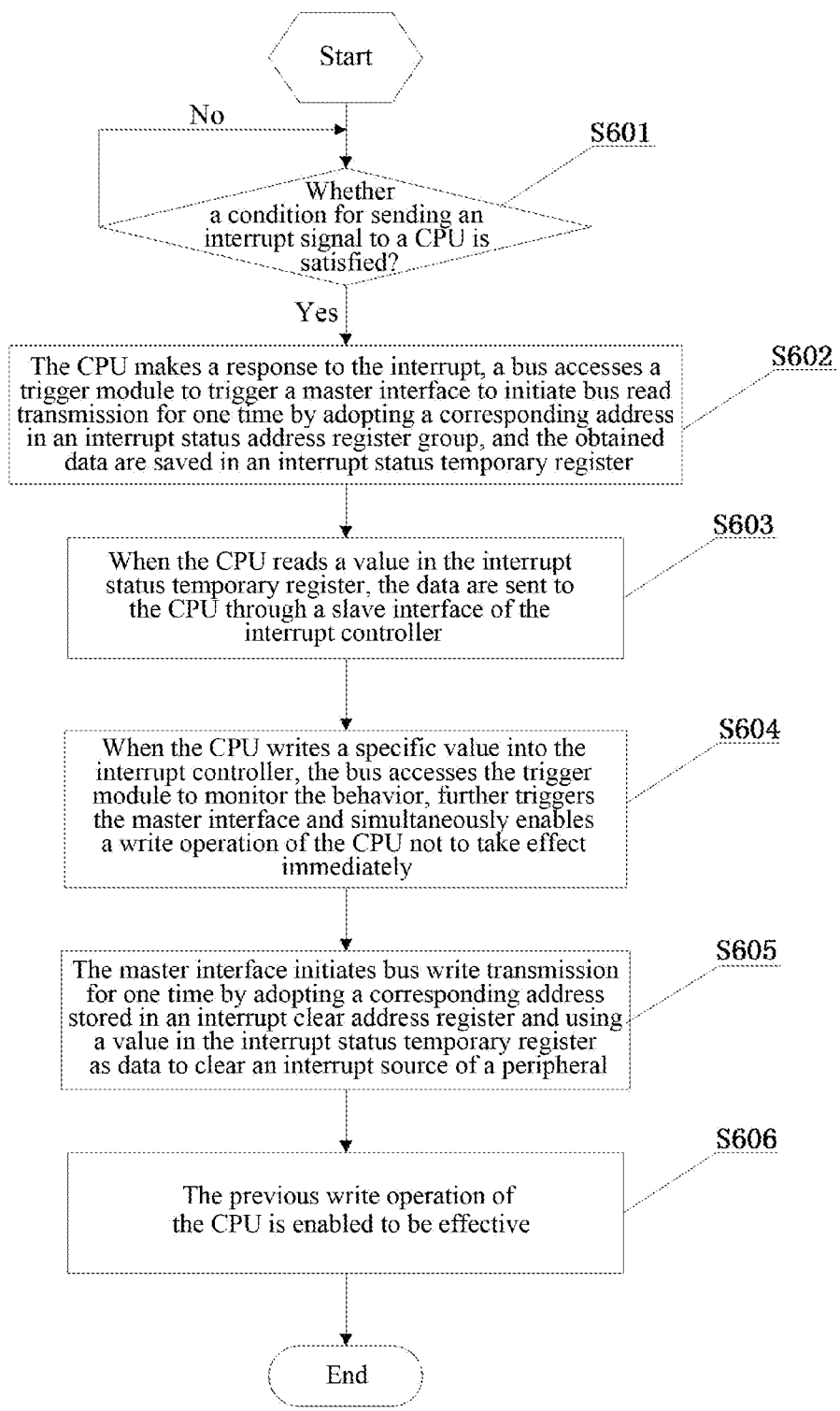
FIG. 6 illustrates a flowchart of an interrupt source clearing process provided by embodiment 3 of the present document.

Based on the abovementioned interrupt controller, an interrupt processing process is as shown in FIG. 5 and FIG. 6, herein, FIG. 5 illustrates a trigger process of interrupt source clearance; and FIG. 6 illustrates an operation process of interrupt source clearance. The process respectively includes:

In step 501, when a peripheral drive is initialized, an interrupt status register address of a peripheral is written into a corresponding interrupt status address register group, and an interrupt clear register address of the peripheral is written into a corresponding interrupt clear address register group.

In step 502, initialization is performed and an interrupt is hooked to an operating system, mainly including setting interrupt enable or not, interrupt priority and triggering mode in an interrupt controller, registering the interrupt to the system, etc.

In step 503, wait for interrupt trigger.

In step 504, the interrupt is triggered, an interrupt number of a current response is read from the interrupt controller and then a corresponding interrupt processing program is called according to an interrupt number index.

Under a situation that one peripheral contains a plurality of interrupt sources, an interrupt status needs to be read to judge an interrupt source that produces the interrupt. Due to different access speeds of different buses and existence of a bus bridge, this step needs a CPU to spend certain time and the time is almost the same as the time spent by an interrupt clearing method. Therefore, in this embodiment, once it is monitored that the CPU makes a response to the interrupt (it may be detected through an interrupt signal sent by the interrupt controller to the CPU, but it is not limited to this monitoring method), a bus read access is initialized immediately by adopting a corresponding address in the interrupt status address register group, so as to read in advance the content in the interrupt status register of the peripheral into the interrupt status temporary register.

In step 505, the CPU directly reads the content from the interrupt status temporary register when the CPU needs to read the content in the interrupt status register of the peripheral.

In mobile chip design, interaction between the interrupt controller and the CPU generally has a very low delay, and thus by temporarily storing the data needed by the CPU in advance into the register in the interrupt controller, it obviously has a lower access delay. If the abovementioned operation of reading in advance performed by the interrupt controller has not been completed, when reading is performed, then the read operation of the CPU is blocked firstly till the read operation of the interrupt controller is completed. Since the read operation of the interrupt controller has already been started when the interrupt is produced just right, microsecond-scale time has already elapsed when a drive interrupt service program is entered, and thus the probability of blocking the CPU is almost zero.

In step 506, after the CPU completes the processing of the interrupt, interrupt processing completion identification information (specific content of the identification information is defined by the interrupt controller) is written into the interrupt controller to trigger an interrupt source clear operation.

After a drive interrupt processing function in the CPU is executed, a designated value (defined by the interrupt controller, i.e., interrupt processing completion identification information) needs to be written back into a designated register of the interrupt controller to inform the interrupt controller about the completion of the processing of the current interrupt, and the interrupt controller may continuously performing sampling to an interrupt line corresponding to the current interrupt to make a response to a new interrupt. At this moment, the write operation of the CPU will be monitored by a bus access trigger module (monitoring may be based on but not limited to the written register address), the bus access trigger module will enable the write operation of the CPU not to take effect immediately (if the write operation of the CPU is allowed to take effect, the current interrupt will be triggered for a second time since the external interrupt has not been cleared at this moment). The bus access trigger module simultaneously will trigger the interrupt controller to initiate bus write transmission for one time through a master interface by adopting the address stored in the interrupt clear address register and using the value in the interrupt status temporary register as data to clear the interrupt source of the peripheral, then enables the previous write operation of the CPU to be effective and enables the sampling performed by the interrupt controller to the current interrupt line; and when the interrupt controller clears the interrupt source, the CPU may continuously perform other operations or make responses to other interrupts without waiting for the completion of the clearance of the current peripheral interrupt. The abovementioned process is as illustrated in FIG. 6 and includes the following steps:

In step 601, an interrupt controller judges whether a condition for sending an interrupt signal to a CPU is satisfied according to interrupt enable or not, interrupt triggering mode and interrupt priority preset by a user; if yes, the process turns to step 602; and otherwise, judgment is continuously made.

In step 602, the CPU makes a response to the interrupt, a bus access trigger module detects that the CPU has already made the response to the interrupt, a master interface is triggered to initiate bus read transmission for one time by adopting a corresponding address in an interrupt status address register group, and the obtained data are saved in an interrupt status temporary register.

In step 603, when the CPU reads a value in the interrupt status temporary register, the data are sent to the CPU through a slave interface of the interrupt controller.

In step 604, when the CPU writes a specific value into a register designated by the interrupt controller to indicate that the processing of the interrupt is ended, the bus access trigger module has monitored the behavior, further triggers the master interface and simultaneously enables a write operation of the CPU not to take effect immediately.

In step 605, the master interface initiates bus write transmission for one time by adopting a corresponding address stored in an interrupt clear address register and using a value in the interrupt status temporary register as data to clear an interrupt source of a peripheral.

In step 606, the previous write operation of the CPU is enabled to be effective.

It can be seen that, in the present document, by adding hardware which is used for storing the interrupt source clear information and the corresponding bus access trigger module in the interrupt controller to replace the work of partial software, operation steps which have no requirement on execution sequence in the interrupt processing program can be executed in parallel, i.e., the interrupt source clear information can be acquired in advance and stored in the interrupt controller before the processing of the interrupt is completed, the corresponding interrupt source clear information can be directly read from the interrupt controller when interrupt source clearance needs to be performed, and thereby the time spent by the CPU in processing the interrupt can be shortened. This has a great significance in a real-time system which has an excessively heavy interrupt load. Simultaneously, users do not need to distinguish trigger types of interrupts during interrupt processing and the interrupt processing process is unified.

The abovementioned contents are further detailed descriptions made to the present document in combination with the specific embodiments, and the specific implementation of the present document shall not be considered as limited to these descriptions only. One skilled in the art may further make some simple deductions or replacements without departing from the concept of the present document, and such deductions or replacements should be viewed as included in the protection scope of the present document.

INDUSTRIAL APPLICABILITY

According to the interrupt processing method and the interrupt controller in the abovementioned technical solution, before a CPU writes interrupt processing completion identification information of a current interrupt into an interrupt controller, interrupt source clear information of the interrupt is stored into the interrupt controller; and then when the interrupt controller receives a request, sent by the CPU, for writing the interrupt processing completion identification information, an interrupt source of the interrupt is directly cleared according to the interrupt source clear information stored in the interrupt controller, and the CPU does not need to firstly access an interrupt clear register of a corresponding peripheral through a plurality of bus converter bridges to acquire information needed for clearing the interrupt source and then perform clearance. Therefore, the solution provided by the present document can shorten the time needed for clearing the interrupt source to a relatively great extent and avoid delaying the response time of other interrupts. Therefore, the present document has very strong industrial applicability.

What is claimed is:

1. An interrupt processing method, comprising:
    before a CPU writes interrupt processing completion identification information of a current interrupt into an interrupt controller, storing interrupt source clear information of the interrupt into the interrupt controller; and
    when the interrupt controller receives a request, sent by the CPU, for writing the interrupt processing completion identification information, clearing an interrupt source of the interrupt according to the interrupt source clear information stored in the interrupt controller, wherein after the CPU processes the interrupt, the clearance of the interrupt source can be directly performed according to the interrupt source clear information stored in advance in the interrupt controller,
    wherein, the interrupt source clear information comprises an interrupt clear register address of a peripheral which produces the interrupt and content in an interrupt status register corresponding to the interrupt,
    wherein, the step of storing the interrupt source clear information of the interrupt into the interrupt controller comprises:
    when the CPU makes a response to the interrupt produced by the peripheral, reading content in the interrupt status register corresponding to the interrupt according to the interrupt status register address, and storing the content in the interrupt status register corresponding to the interrupt into the interrupt controller,
    wherein, after the CPU makes the response to the interrupt and when the content in the interrupt status register corresponding to the interrupt needs to be acquired, the content is acquired from the interrupt controller by directly using the interrupt status register address stored in the interrupt status register.

2. The interrupt processing method according to claim 1, wherein, the step of storing the interrupt source clear information of the interrupt into the interrupt controller comprises:
    when the peripheral is initialized, acquiring the interrupt clear register address of the peripheral and storing the interrupt clear register address into the interrupt controller.

3. The interrupt processing method according to claim 2, wherein, the step of clearing the interrupt source of the interrupt according to the interrupt source clear information stored in the interrupt controller comprises:
    initiating bus write transmission by adopting the interrupt clear register address and using the content in the interrupt status register as data to clear the interrupt source.

4. The interrupt processing method according to claim 1, the method further comprises: when the peripheral is initialized, acquiring an interrupt status register address of the peripheral and storing the interrupt status register address into the interrupt controller.

5. The interrupt processing method according to claim 4, wherein, the step of clearing the interrupt source of the interrupt according to the interrupt source clear information stored in the interrupt controller comprises:
    initiating bus write transmission by adopting the interrupt clear register address and using the content in the interrupt status register as data to clear the interrupt source.

6. The interrupt processing method according to claim 1, wherein, the step of clearing the interrupt source of the interrupt according to the interrupt source clear information stored in the interrupt controller comprises:
    initiating bus write transmission by adopting the interrupt clear register address and using the content in the interrupt status register as data to clear the interrupt source.

7. The interrupt processing method according to claim 1, wherein, the interrupt is a level-triggered interrupt.

8. An interrupt controller, comprising a storage module and an interrupt clear module, wherein,
    the interrupt clear module is arranged to, before a CPU writes interrupt processing completion identification information of a current interrupt into the interrupt controller, acquire interrupt source clear information of the interrupt and store the interrupt source clear information into the storage module; and when the interrupt controller receives a request, sent by the CPU, for writing the interrupt processing completion identification information, clear an interrupt source of the interrupt according to the interrupt source clear information stored in the storage module, wherein after the CPU processes the interrupt, the clearance of the interrupt source can be directly performed according to the interrupt source clear information stored in advance in the interrupt controller; and
    the storage module is arranged to store the interrupt source clear information,
    wherein, the interrupt source clear information comprises an interrupt clear register address of a peripheral which produces the interrupt and content in an interrupt status register corresponding to the interrupt,
    the storage module comprises an interrupt status register content storage unit;
    the interrupt clear module is further arranged to, when the CPU module makes a response to the interrupt produced by the peripheral, read the content in the interrupt status register corresponding to the interrupt according to the interrupt status register address, and store the content in the interrupt status register corresponding to the interrupt into the interrupt status register content storage unit; and
    the interrupt status register content storage unit is arranged to store the content in the interrupt status register corresponding to the interrupt,
    wherein, the interrupt status register content storage unit is further arranged to, after the CPU makes the response to the interrupt and when the content in the interrupt status register corresponding to the interrupt needs to be acquired, provide the CPU with the content in the interrupt status register stored by the interrupt status register content storage unit.

9. The interrupt controller according to claim 8, wherein, the storage module further comprises an interrupt clear register address storage unit;
   the interrupt clear module is further arranged to, when the peripheral is initialized, acquire the interrupt clear register address of the peripheral and store the interrupt clear register address into the interrupt clear register address storage unit; and
   the interrupt clear register address storage unit is arranged to store the interrupt clear register address of the peripheral.

10. The interrupt controller according to claim 9, wherein, the interrupt clear module is arranged to clear the interrupt source of the interrupt according to the interrupt source clear information stored in the storage module in accordance with the following modes:
   initiating bus write transmission by adopting the interrupt clear register address and using the content in the interrupt status register as data to clear the interrupt source.

11. The interrupt controller according to claim 8, wherein, the storage module further comprises an interrupt status register address storage unit;
   the interrupt clear module is further arranged to, when the peripheral is initialized, acquire an interrupt status register address of the peripheral and store the interrupt status register address into the interrupt status register address storage unit; and
   the interrupt status register address storage unit is arranged to store the interrupt status register address of the peripheral.

12. The interrupt controller according to claim 11, wherein, the interrupt clear module is arranged to clear the interrupt source of the interrupt according to the interrupt source clear information stored in the storage module in accordance with the following modes:
   initiating bus write transmission by adopting the interrupt clear register address and using the content in the interrupt status register as data to clear the interrupt source.

13. The interrupt controller according to claim 8, wherein, the interrupt clear module is arranged to clear the interrupt source of the interrupt according to the interrupt source clear information stored in the storage module in accordance with the following modes:
   initiating bus write transmission by adopting the interrupt clear register address and using the content in the interrupt status register as data to clear the interrupt source.

* * * * *